United States Patent [19]

Wachtel

[11] 4,042,849

[45] Aug. 16, 1977

[54] DISCHARGE LAMP WITH BLACK LIGHT TRANSMITTING FILTER LAYER

[75] Inventor: Anselm Wachtel, Pittsburgh, Pa.

[73] Assignee: Westinghouse Electric Corporation, Pittsburgh, Pa.

[21] Appl. No.: 734,070

[22] Filed: Oct. 20, 1976

[51] Int. Cl.[2] ........................ H01J 61/40; H01J 61/44; G02B 5/22

[52] U.S. Cl. .................................... 313/489; 252/300; 313/112

[58] Field of Search ............... 313/489, 112, 493, 486, 313/487; 252/300 R

[56] References Cited

U.S. PATENT DOCUMENTS

| | | | |
|---|---|---|---|
| 2,355,258 | 8/1944 | Biggs et al. | 313/112 X |
| 2,382,939 | 8/1945 | Koch | 313/489 |
| 2,392,095 | 1/1946 | Lemmers | 252/300 R |
| 2,413,940 | 1/1947 | Bickford, Jr. | 313/489 X |
| 3,947,719 | 3/1976 | Ott | 313/489 |

*Primary Examiner*—Palmer C. Demeo

*Attorney, Agent, or Firm*—W. D. Palmer

[57] ABSTRACT

A low-pressure mercury discharge device utilizing a black light generating phosphor coating in conjunction with a black light transmitting filter pigment. The black light transmitting filter pigment effectively transmits black light radiation and filters visible light radiation. The filter comprises magnesium phosphate doped with cobalt and nickel having a formula $Mg_{3-x-y}Co_xNi_y(PO_4)_2$, $x + y$ is from 1 to 1.4, $x/y$ is from .8 to 1.2.

4 Claims, 3 Drawing Figures

DISCHARGE LAMP WITH BLACK LIGHT TRANSMITTING FILTER LAYER

BACKGROUND OF THE INVENTION

This invention relates to a low-pressure mercury discharge device for generating black light radiations, and, more particularly, to a device that includes a filter to filter out visible light radiations that would otherwise be transmitted by the device.

A number of black light lamps have been developed in recent years. These lamps generally have a special glass envelope designed to filter out visible light. They are expensive because of the high cost of the special glass required and the susceptibility of the glass to breakage during lamp manufacture. Elimination of the need for the special glass will reduce the cose of the lamp substantially.

SUMMARY OF THE INVENTION

There is provided a low-pressure mercury discharge device for generating black light radiations. The device comprises an elongated radiation-transmitting envelope enclosing a discharge-sustaining filling. The filling comprises mercury and a low pressure of an inert ionizable starting gas. Two electrodes are operatively positioned proximate the ends of the envelope. The electrodes are operable to sustain the short wavelength ultraviolet generating discharge therebetween. A filter means is carried as a layer on the interior surface of the envelope and substantially comprises finely divided magnesium orthophosphate doped with cobalt and nickel. The amount of the dopant is sufficient to absorb a substantial portion of any visible radiation generated within the device. A finely divided black light generating phosphor means is carried on the layer of the filter means. The phosphor means is operable to convert the short-wavelength ultraviolet radiation generated by the discharge into black light radiation.

The filter layer has the formula $Mg_{3-x-y}Co_xNi_y(PO_4)_2$, where $x + y$ is from 1 to 1.4, and $x/y$ is from .8 to 1.2. The optimum composition is when the ratio of $x/y$ is about unity and $x + y$ is about 1.2.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENT

Figure 1:
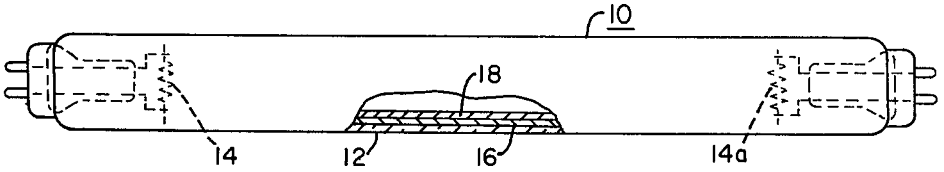
FIG. 1 is an elevation, partly in section of a black light generating, low-pressure mercury discharge device coated in accordance with the invention.

In FIG. 1 is shown a low-pressure mercury discharge device 10 designed for generating black light radiation. The discharge device 10 comprises an elongated radiation-transmitting envelope 12, fabricated of conventional soda-lime-silicate glass for example, enclosing a discharge sustaining filling comprising mercury and low-pressure of the inert ionizable starting gas. Electrodes 14, 14A are operatively positioned proximate the ends of the envelope 12 and are operable to sustain the short-wavelength ultraviolet generating discharge therebetween. A filter means 16 is carried as a layer on the interior surface of the envelope 12. Filter means 16 substantially comprises finely divided magnesium orthophosphate doped with a small amount of cobalt and nickel sufficient to absorb a substantial portion of any visible radiation generated within the device 10. A layer of finely divided black light generating phosphor means 18 is carried on the layer of the filter means 16. The phosphor means is operable to convert short wavelength ultraviolet radiation generated by the discharge into black light radiation.

Figure 2:
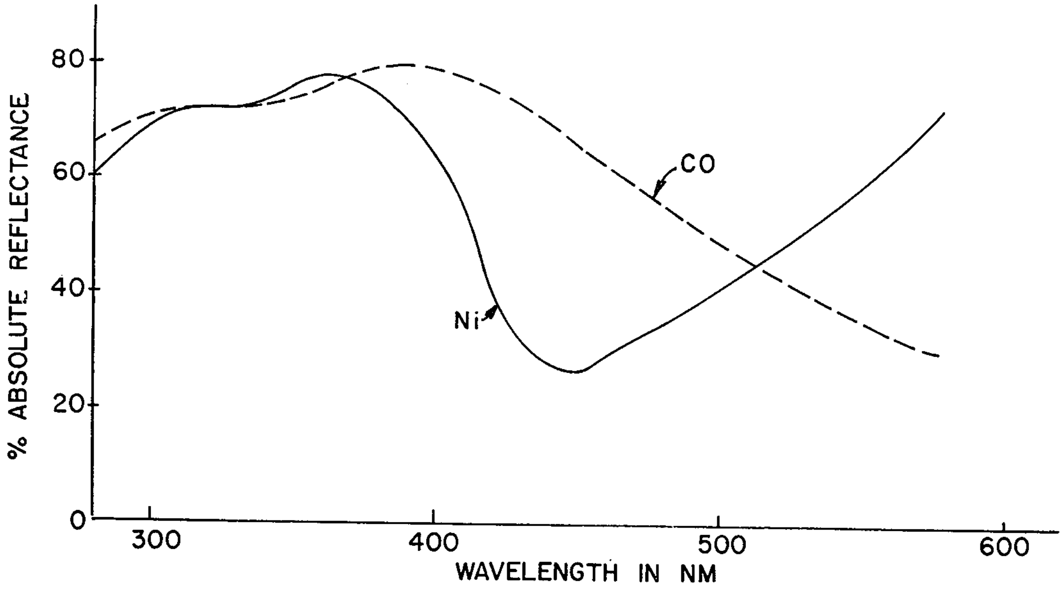
FIG. 2 is a graph showing the percent of absolute reflectance of magnesium orthophosphate doped separately with a small amount of cobalt or nickel for various wavelengths in nanometers.
Figure 3:
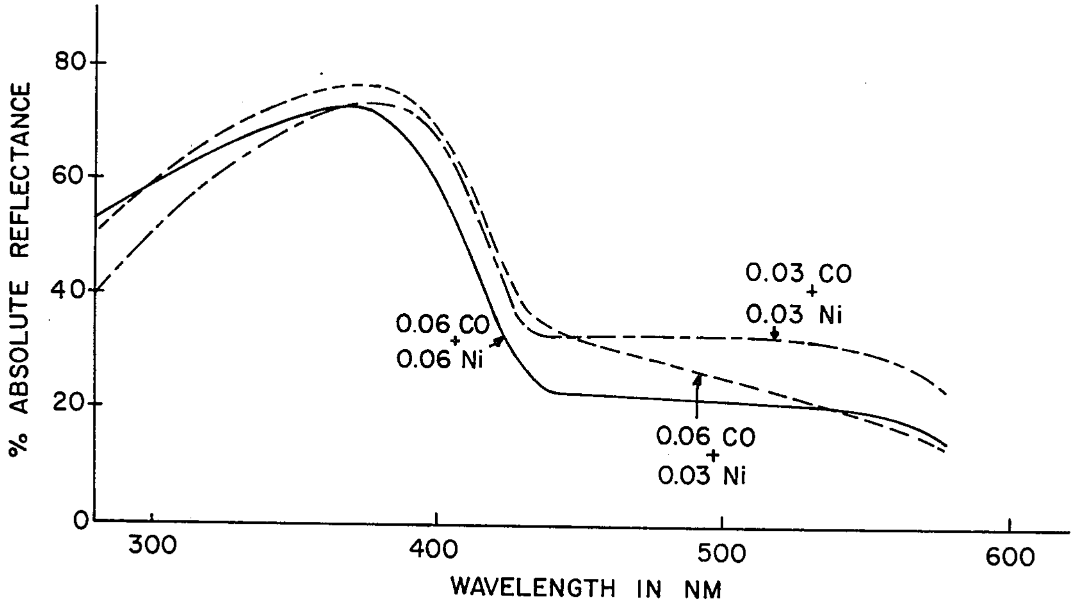
FIG. 3 is a graph showing the percent absolute reflectance of magnesium orthophosphate with different concentrations of cobalt and nickel for various wavelengths in nanometers.

The filter means 16 has the formula $Mg_{3-x-y}Co_xNi_y(PO_4)_2$, wherein $x + y$ is from 1 to 1.4, and $x/y$ is from 0.8 to 1.2. The effectiveness of cobalt or nickel alone as a doping agent is shown in FIG. 2 wherein there is plotted reflectance vs. wavelengths for magnesium orthophosphate doped with 0.03 gram-atom of cobalt alone or nickel alone per mole of phosphate. As shown, with only a cobalt or nickel dopant, the reflectance can be quite high in the visible so that the effectiveness of the filter is impaired. This should be compared to the results shown in FIG. 3 wherein both cobalt and nickel dopants are used with the filter performance substantially enhanced. The graph in FIG. 3 also shows that the Co/Ni ratio desirably should be about unity although a ratio of 0.8 to 1.2 will work.

The pigment may be prepared by any of the methods known to the art, for example, by solid-state reaction of the requisite oxides or compounds decomposable to the oxides or by precipitation of the mixture of the requisite proportions of soluble Mg, Co and Ni salts from aqueous solution, using a suitable source of phosphate ions, such as $Na_3PO_4$. The latter method is illustrated in the following example:

0.18 $Mg(NO_3)_2 \times 6H_2O = 46.16$ g dissolved in 150 ml $H_2O$ are purified by boiling with Mg ribbon and filtering.

0.06 $Co(NO_3)_2 \times 6H_2O = 17.46$ g and 0.06 $Ni(NO_3)_2 \times 6H_2O = 17.45$ g dissolved in 200 ml $H_2O$ is filtered and added to the foregoing Mg solution.

0.21 $Na_3PO_4 \times 12H_2O$ (98%) = 81.46 g containing 2.3% free NaOH, is dissolved in 400 ml $H_2O$ and neutralized with 2.93 ml $HNO_3$. To this is added 0.0042 (2%) $H_3PO_4 = 0.48$ g. The solution is then filtered.

The Mg-Co-Ni solution is heated to boiling and stirred while the $PO_4$ solution is added at the rate of about 2 drops per second. At the end of the precipitation, the product is filtered, washed and dried. It is then placed in a cold furnace and the temperature raised to about 900° C so as to remove volatile components. The produce is then remixed and fired at about 1100° C for about 3 hours in a silica crucible in air. Finally, it is grounded to pass 400 mesh. The product represents 0.1 mole of $Mg_{1.8}Co_{0.6}Ni_{0.6}(PO_4)_2$.

To test the filter means 16, 20 watt lamps were prepared by first depositing the filter means 16 in nitrocellulose lacquer, drying and then applying the ultraviolet emitting phosphor in ethylcellulose lacquer and drying again as is well known in the art. The Table following shows the optical property of the filter means as well as 20 watt fluorescent lamp results as a function of Co and Ni whereby the ratio Co/Ni was maintained at unity. Europium activated strontium fluoroborate phosphor was used as the ultraviolet emitting phosphor. However, any black light emitting phosphor can be used such as lead activated barium di-silicate phosphor.

TABLE

| | Plaque Reflectance (Arbitrary Units) | | | |
|---|---|---|---|---|
| Sample | x + y (x = y) | UV 365 nm | white | 365 nm ÷ white |
| 1 | 0.12 | 37 | 29.5 | 1.25 |
| 2 | 0.30 | 41 | 27.7 | 1.48 |
| 3 | 0.60 | 39 | 13.6 | 2.86 |
| 4 | 0.90 | 41 | 12.1 | 3.39 |
| 5 | 1.20 | 38 | 8.7 | 4.37 |
| 6 | 1.50 | 32 | 15.9 | 2.01 |
| | 20 Watt Lamp Data (Arbitrary Units) | | | |
| Lamp No. | x + y (x = Y) | UV 365 nm | Green 546 nm | UV 365 nm ÷ Green 546 nm |
| 1 | 0.12 | 545 | 55 | 9.9 |
| 2 | 0.30 | 574 | 55 | 10.45 |
| 3 | 0.60 | 588 | 53.5 | 11.0 |
| 4 | 0.90 | 477 | 35 | 13.6 |
| 5 | 1.20 | 390 | 24 | 16.25 |
| 6 | 1.50 | 320 | 23 | 13.9 |

The data show that as the doping level increases in the system $Mg_{3-x-y}Co_xNi_y(PO_4)_2$, the ultraviolet and visible absorptions vary in such a manner that up to $x + y = 1.2$, the ratio of reflected ultraviolet/visible increases. At still higher doping levels, however, the optical characteristics deteriorate. The filter means 16 as described approaches the filtering efficiency of black light glass. Visually, the present lamps display very little visible light emission, although their appearance in daylight is much lighter than lamps using black light glass. The lamp as described herein is thus equivalent to the lamps which incorporate the black light glass, and the substantial added costs of the black light glass are eliminated. Lamps made with envelopes free from ultraviolet absorbing additives such as Ti or Sb are more desirable than envelopes containing those elements.

I claim:

1. A low-pressure mercury discharge device for generating black light radiation and comprising, an elongated radiation-transmitting envelope enclosing a discharge-sustaining filling comprising mercury and a low-pressure of an inert ionizable starting gas, electrodes operatively positioned proximate the ends of said envelope and operable to sustain a short-wavelength ultraviolet-generating discharge therebetween, a filter means carried as a layer on the interior surface of said envelope and substantially comprising finely divided magnesium orthophosphate doped with a small amount of cobalt and nickel sufficient to absorb a substantial portion of any visible radiation generated within said device, and a finely divided black light generating phosphor means carried on said layer of said filter means and operable to convert said short-wavelength ultraviolet radiation generated by said discharge into black light radiation.

2. Discharge device as claimed in claim 1, wherein said filter layer has the formula $Mg_{3-x-y}Co_xNi_y(PO_4)_2$, $x + y$ is from 1 to 1.4, and $x/y$ is from 0.8 to 1.2.

3. The discharge device as claimed in claim 2, wherein said ratio of $x/y$ is about unity and $x + y$ is about 1.2.

4. The discharge device of claim 3, wherein said black light generating phosphor means is europium activated strontium fluoroborate phosphor.

* * * * *